United States Patent [19]

Dauber et al.

[11] Patent Number: 5,500,038

[45] Date of Patent: Mar. 19, 1996

[54] NON-PARTICULATING COMPACT ADSORBENT FILTER

[75] Inventors: Edwin G. Dauber, Chesapeake City; William P. Mortimer, Jr., Conowingo, both of Md.; Michael S. Winterling, Newark, Del.

[73] Assignee: W. L. Gore & Associates, Inc., Newark, Del.

[21] Appl. No.: 298,484

[22] Filed: Aug. 30, 1994

[51] Int. Cl.⁶ .................................................. B01D 53/04
[52] U.S. Cl. ................... 96/135; 96/147; 96/153; 96/154; 55/385.1; 55/514
[58] Field of Search ................. 95/90, 116, 141; 96/108, 134, 135, 147, 153, 154; 55/385.1, 385.3, 385.4, 385.6, 512–516

[56] References Cited

U.S. PATENT DOCUMENTS

| 2,214,925 | 9/1940 | Guthrie | 96/134 |
|---|---|---|---|
| 3,616,604 | 11/1971 | Schouw | 55/515 X |
| 3,953,566 | 4/1976 | Gore | 264/288 |
| 4,208,194 | 6/1980 | Nelson | 55/158 |
| 4,208,371 | 6/1980 | Kring | 96/134 X |
| 4,308,041 | 12/1981 | Ellis et al. | 55/514 X |
| 4,427,425 | 1/1984 | Briggs et al. | 96/134 X |
| 4,460,392 | 7/1984 | Poulsen et al. | 96/134 |
| 4,684,510 | 8/1987 | Harkins | 96/135 X |
| 4,732,629 | 3/1988 | Cooper et al. | 156/53 |
| 4,830,643 | 5/1989 | Sassa et al. | 55/316 |
| 4,863,499 | 9/1989 | Osendorf | 55/316 |
| 4,875,899 | 10/1989 | Holtermann | 96/153 X |
| 4,889,542 | 12/1989 | Hayes | 55/385.6 X |
| 4,957,518 | 9/1990 | Brassell | 55/385.4 X |
| 4,957,522 | 9/1990 | Brassell | 96/134 X |
| 4,985,296 | 1/1991 | Mortimer, Jr. | 428/220 |
| 5,030,260 | 7/1991 | Beck et al. | 55/316 |
| 5,124,856 | 6/1992 | Brown et al. | 360/97.03 |
| 5,308,665 | 5/1994 | Sakek et al. | 428/35.2 |
| 5,360,469 | 11/1994 | Baron et al. | 96/134 X |

FOREIGN PATENT DOCUMENTS

| 0040821 | 12/1981 | European Pat. Off. . | |
|---|---|---|---|
| 0491175 | 6/1992 | European Pat. Off. . | |
| 0494550 | 7/1992 | European Pat. Off. . | |
| 0517021 | 12/1992 | European Pat. Off. . | |
| 62-026899 | 2/1987 | Japan | 96/108 |
| 0148151 | 1/1962 | U.S.S.R. | 96/108 |
| 2126123 | 3/1984 | United Kingdom | 96/153 |
| WO91/14496 | 10/1991 | WIPO . | |
| WO91/17551 | 11/1991 | WIPO . | |

OTHER PUBLICATIONS

PCT International Search Report for PCT/US94/11702.
R. K. McGeary, "Mechanical Packing of Spherical Particles", Vo. 44, No. 10, Oct. 1961, pp. 513–522.

*Primary Examiner*—Robert Spitzer
*Attorney, Agent, or Firm*—Victor M. Genco, Jr.

[57] ABSTRACT

A compact sorbent filter for selectively sorbing contaminants and method of removing contamination from an enclosure with a filter is disclosed. The filter comprises a sorbent core including contaminant adsorbing material therein, an outer protective cover wrapped around the inner sorbent core so as to completely contain the sorbent core, with the exposed end(s) of the core being capped so as to encapsulate the sorbent core present within the filter while not limiting the amount of material contained therein. A sorbing filter is placed within an enclosure to remove gaseous contamination therein. The filter is particularly suitable for use in a computer disk drive or similar enclosure where out-gassing contamination may be a problem.

23 Claims, 4 Drawing Sheets

NON-PARTICULATING COMPACT ADSORBENT FILTER

FIELD OF THE INVENTION

This invention relates to devices for filtering or removing contaminants from a confined environment, such as gaseous contaminants in electronic or optical devices (e.g., computer disk drives).

BACKGROUND OF THE INVENTION

Many enclosures that contain sensitive instrumentation must maintain very clean environments in order to operate properly. Examples include: enclosures with sensitive optical surfaces or electronic connections that are sensitive to particulates and gaseous contaminants which can interfere with mechanical or electrical operation; data recording devices, such as computer hard disk drives that are sensitive to particles, organic vapors, and corrosive vapors; and electronic control boxes such as those used in automobiles that are sensitive to moisture buildup and corrosion as well as contamination from fluids and vapors. Contamination in such enclosures originate from both inside and outside the enclosures. For example, in computer hard drives, damage may result from external contaminates as well as out-gassing from internal components.

One serious contamination-related failure mechanism in computer disk drives is static friction or "stiction." Stiction is the adhesion of a drive head to a disk while the disk is stopped. Newer high density disks are more sensitive to contamination caused stiction because they are smoother and only thin layers of lubricants are used. Contaminants on the disk change the surface energy and the adhesive forces between the disk and the head which causes stiction. Also, vapors which condense in the gap between the head and disk can cause stiction. Further exacerbating these effects, new disk drives have smaller, low energy motors with lower torque.

In addition, disk drives must be protected against a large number of contaminants in the surrounding environment. This is true for drives used in small to medium sized computer systems which may not be used in the typical data processing environment and is especially true in drives that are removable and transportable to any environment, such as disk drives that are used in Personal Computer Memory Card International Association (PCMCIA) slots.

One successful approach in controlling contamination has been with the use of sorbent filters. Sorbent filters must keep the enclosures free of contamination from both internal and external sources. In addition to requirements to provide cleaner environments, filters must be made smaller to fit into small enclosures. An excellent example of space constraints in modern electronic components is in the area of computer disk drives. Today, PCMCIA computer disk drives have up to 170 MB storage and are only approximately 5 cm wide and 7.5 cm long. Current production Type 3 PCMCIA drives have a maximum thickness of 10.5 mm. In the near future extremely compact Type 2 drives, which have a maximum thickness of 5 mm, and Type 1 drives, which have a maximum thickness of 3.3 mm are planned.

Sorbent breather filters used to keep particulates and vapors from entering enclosures are well known. These can be made by filling a cartridge of polycarbonate, acrylonitrile butadiene styrene (ABS), or similar material with sorbent and securing filter media on both ends of the cartridge. Examples of such filters are described in U.S. Pat. Nos. 4,863,499, issued to Osendorf, (an anti-diffusion chemical breather assembly for disk drives with filter media having a layer with impregnated activated charcoal granules); 5,030,260 issued to Beck et al., (a disk drive breather filter including an assembly with an extended diffusion path); 5,124,856 issued to Brown et al., (a unitary filter medium impregnated with activated carbon fibers to protect against organic and inorganic pollutants). Unfortunately, none of these devices is believed suitable for today's more demanding applications. For instance, many of these kinds of devices present their own contamination risks, such as out-gassing from adhesives or chemicals, or particulation. Further, in order to supply adequate quantities of sorbent materials, most existing breather filters are too large to fit within increasingly smaller electronic components.

In a distinctly different use, U.S. Pat. No. 4,208,194 issued to Nelson discloses a personal monitoring device that collects chemicals to be tested. The collecting layer is composed of a porous polytetrafluoroethylene (PTFE) sheet containing a particulate sorbent. Again, the collecting layer of this device may particulate and is not designed for use in small enclosures.

A commercially successful "tube" filter is disclosed in U.S. Pat. No. 4,830,643 issued to Sassa et al. This patent teaches a sorbent filter where a powdered sorbent is encapsulated in an outer expanded PTFE tube. This tube filter is manufactured by W. L. Gore and Associates, Inc. Elkton, Md., and is commercially available under the trademark GORE SORBER® module. While this apparatus is highly effective, the filter is currently available only in large and medium sizes (e.g., filter volumes down to about 3 cc). In its present form, this filter is incapable of fully addressing growing needs for even smaller and more compact sorbent filters containing a higher sorbent density.

Sorbent filter manufacturers have encountered several obstacles in producing very small tube sorbent filters. First, as tube size (diameter) decreases, filling the tube with sorbent powder becomes more difficult. This problem is compounded by the common use of larger granular sorbent powders to avoid "dusting" contamination.

Second, as tube size decreases, it is more difficult to fill the tube filters without having the powder settle on the external tube surfaces and the seal areas. The powder on the outside tube can contaminate the devices near the tube and also prevent the outer tube from sealing, which may also present dusting problems through leakage.

Third, as diameters are reduced, the ratio of the volume occupied by the sorbent material to the volume occupied by the sorbent filter assembly substantially and disproportionately decreases. This disproportional volume decrease occurs because the volume occupied by the tubing wall thickness and the volume consumed by the crimping of the tube ends becomes a larger percentage of the total tube filter volume. Using a thinner tubing thicknesses could increase sorbent volume, but this increases tube filling difficulties and makes seal formation more difficult.

Fourth, many new applications for sorbent filters require spill proof sorbent materials. However, the use of loose particles in existing filled tube filters, if broken, could spill the loosely packed adsorbent material into the enclosure, damaging the integral components.

Another sorbent filter commercially available from W. L. Gore & Associates, Inc., called a GORE-TEX™ Stand Alone Adsorbent Assembly, consists of a composite sorbent-filled PTFE planar core which is laminated on its top and bottom surfaces with a porous expanded PTFE membrane.

This filter fits into slots in an enclosure interior. The sorbent-filled PTFE core can be filled with various sorbent materials selected to adsorb hydrocarbons, moisture, out-gassed plasticizers, corrosives, etc. Although this sorbent assembly provides a low profile compact sorbent assembly, concern has been expressed that the unsealed sides of this device may not provide adequate protection from shedding of sorbent material particles.

Accordingly, it is a primary purpose of the present invention to provide an improved compact sorbent filter that effectively removes contaminants from an enclosed environment while occupying minimal space.

It is a further purpose of the present invention to provide a sorbent filter that is quite compact while having a high ratio of sorbent material to overall filter volume.

It is an additional purpose of the present invention to provide a sorbent filter which is non-out-gassing and non-particulating.

Still another purpose of the present invention is to provide a sorbent filter that is readily handled and installed.

These and other purposes of the present invention will become evident from review of the following specification.

SUMMARY OF THE INVENTION

The present invention is a compact sorbent assembly for reduction of contamination in enclosed areas.

A preferred embodiment of the present invention comprises a sorbent core containing contaminant adsorbing material, and a very thin outer protective cover wrapped around the inner sorbent core so as to completely contain the sorbent core, while leaving its two ends exposed. Particularly preferred is a cigarette or spiral wrap of the cover around the core. The two exposed ends of the container are sealed, such as with separate end caps, so as to encapsulate the sorbent core present within the container while not limiting the amount of material contained therein.

The present invention solves many of the previously mentioned problems with existing sorbent filters. In extremely small filter sizes, the sorbent filter of the present invention is believed to have a higher ratio of sorbent material to overall filter volume than any previously available. The filter can be made in small sizes, but still contains sufficient sorbent material to adsorb high volumes of contamination. Moreover, the filter is non-particulating, non-out-gassing, and easy to handle and install.

BRIEF DESCRIPTION OF THE DRAWINGS

The operation of the present invention should become apparent from the following description when considered in conjunction with the accompanying drawings, in which.

DETAILED DESCRIPTION OF THE INVENTION

Figure 1A:
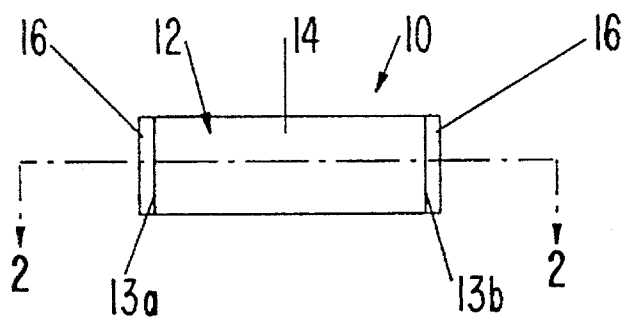
FIG. 1A is a top view of a first embodiment of the filter unit of the present invention, where the sorbent core is wrapped longitudinally by a thin protective cover and the core ends are sealed.
Figure 1B:
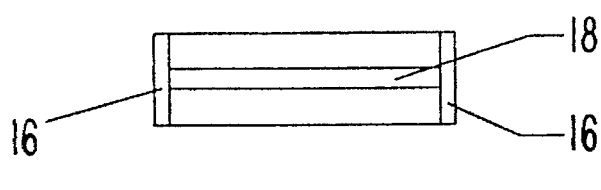
FIG. 1B is a side view of the embodiment shown in FIG. 1A.
Figure 1C:
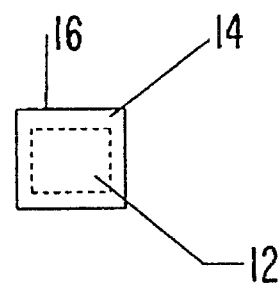
FIG. 1C is an end view of the embodiment shown in FIG. 1A.
Figure 2B:
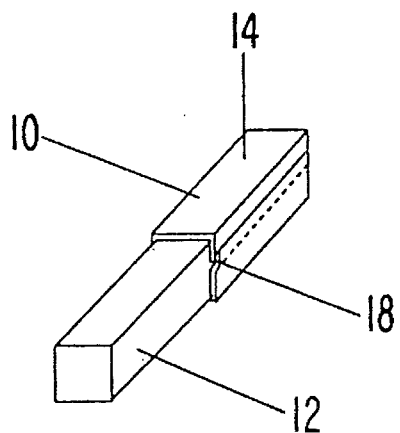
FIG. 2B is a three-quarter isometric view of the filter unit of the present invention, with its core shown in partial cut-away.
Figure 2A:
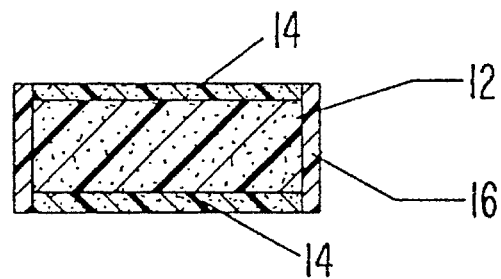
FIG. 2A is a cross-section view of the embodiment of the present invention along line 2—2 of FIG. 1A.

The present invention is a compact sorbent filter capable of removing vapor contaminants from within an enclosure to protect sensitive equipment present within the interior of the enclosure. The present invention also provides a method for sorbing contaminates from an enclosure with a sorbent filter and more particularly, removing contaminates from a disk drive enclosure.

The filter of the present invention differs significantly from previous attempts to produce compact sorbent filters. The filter of the present invention achieves a very high loading of sorbent material in a small space by employing a very thin porous protective cover that is wrapped around the sorbent material. As is explained in greater detail below, when constructed in accordance with the present invention, the protective cover thoroughly seals side walls of the filter device, avoiding risk of particulation or other contamination from the filter unit, while avoiding wasted space often encountered with overly thick tubes and other previous devices that could not pack effective amounts of sorbent material into very small containers. To avoid further wasted space in the ends of the filter unit, such as that occupied by crimped ends in some previous products, the present invention further includes a thin yet effective end cap or sealing procedure that avoids contamination risks while again maximizing the amount of sorbent material the filter can contain.

Various examples of the filter unit of the present invention are illustrated in the accompanying drawings. As shown in FIGS. 1A, 1B, 1C, 2A and 2B, the filter 10 of the present invention comprises a sorbent core 12 wrapped with a thin protective cover 14. Each end 13a and 13b of the sorbent core 12 is capped with end seals 16. In this first embodiment of the present invention, the wrap comprises a "cigarette wrap," where the protective cover 14 is longitudinally wrapped with a single seam 18 running the length of the filter 10. By employing a thin, porous tape as the protective cover, as is explained in detail below, this construction delivers an extremely thin protective cover that is quite effective at sealing the contents of the filter 10 while occupying minimal space with non-sorbing material.

The thin outer protective cover layer 14 may comprise any porous, material that allows vapor contaminants to diffuse through it to the sorbent core layer. The outer protective cover layer 14 also keeps the sorbent material within the filter assembly 10. The cover 14 may include any porous material that allows gas to permeate into the core while thoroughly retaining the core material within the cover. Suitable cover materials may include: polymeric non-shedding filter paper or laminated filter material, porous membrane of polypropylene, nylon, a composite of polycarbonate and polyester, mixed cellulose esters, cellulose triacetate, or porous laminate thereof.

The preferred protective cover material for use in the present invention comprises a membrane of porous expanded polytetrafluroethylene (PTFE), a porous thermoplastic, or thermoset filled PTFE membrane with a thickness in the range of 0.0001 to 0.040 inch.

Additionally, as is disclosed in U.S. Pat. No. 3,953,566 to Gore, incorporated by reference, PTFE provides a number of improved processing advantages, such as being able to be formed in extremely thin dimensions while remaining coherent and pin-hole free, and being able to be made into wide widths that can be slit or extruded to the desired width. As is disclosed in U.S. Pat. No. 4,732,629 to Cooper and PCT Application PCT/GB91/00661 to Gellan et al., both incorporated by reference, thin tapes of filled PTFE may be formed to a thickness of 0.005 to 0.001 inches or less. As has been explained, the thinner the protective covering, while remaining impermeable to dust particles from the core, the more effective the filter of the present invention will be when very small dimensions are produced.

The most preferred outer protective cover material is a porous PTFE membrane filled with a thermoplastic perfluoroalkyl copolymer (PFA). This material is formed around the core to provide a protective cover 14 and is heat sealable to form the seam 18. The PFA is particularly suitable for use in the present invention because it is inert, withstands reasonably high temperatures, and is non-outgassing. Moreover, this method of producing a seam is quite effective at sealing the core while requiring no additional material and occupying no additional space to produce the seal.

Once the core 12 is wrapped with the protective cover 14, protecting the sides of the core from particulating, it is then important that the ends 13a, 13b of the filter 10 likewise be thoroughly sealed. As has been discussed, one presently employed method for sealing a tube around sorbent material simply crimps the ends together and adhering the crimped ends in the crimped position. Unfortunately, this limits the amount of sorbent material that can be contained in a filter of any given volume. In the present invention, one of a number of effective sealing techniques have been employed to maintain full sorbent loading up to the ends of the filter unit 10.

In its simplest form, the ends 13a, 13b may be sealed by applying a liquid sealant, such as thermoplastic or thermoset resin or adhesive, over the ends to produce essentially flat end seals 16. Suitable materials include, but are not limited to: polyethylene, polypropylene, polyester, perfluoroalkyl copolymer (PFA), polyvinylidene fluoride (PVDF), polyvinyl chloride (PVC), urethane, nylon, epoxy, or any other polymer capable of bonding to the ends of the filter 10 to seal and prevent sorbent particles from escaping. The advantage of this approach is that particles are effectively contained within the filter, but no loss of overall filter holding capacity occurs in the sealing procedure.

Alternatively, exposed ends 13a, 13b of the filter 10 can be encapsulated by injection-molding or insert-molding a plastic material. The plastic material may be, but not limited to, acrylo butadiene styrene (ABS), polybutylene teraphthalate (PBT), nylon, polyester, polycarbonate, or any other moldable material.

The most preferred end seal 16 comprises a polyethylene or polyester polymer. These materials are non-out-gassing and flow adequately to seal the cut ends that are exposed after cutting a length of material to the desired filter lengths. The polyester sealed filter ends can be formed by dipping the filter ends into a less than 0.08 cm deep layer of finely ground polyester powder. The ends are then sealed by placing in front of a 550° C. hot air stream. This process should be performed repeatedly to produce a uniform bead of polyester encapsulating the ends.

In another method, a "dip coating" method, the filter ends are dipped into a molten thermoplastic material such as polyethylene, polypropylene, polyester, perfluoroalkyl copolymer (PFA), polyvinylidene fluoride (PVDF), polyvinyl chloride (PVC), nylon, or any other polymer capable of melting and sealing an edge. More particularly, an acceptable seal can be created by forming thin layer (0.05 mm) of polyester on the tip of a soldering iron by passing the soldering iron through a 0.025 mm thick polyester film. The ends of the filter are then pressed against the coated soldering iron tip, transferring an approximately 0.025 mm coating of polyester to the filter ends, thus sealing the filter.

Another sealing method comprises producing a "transfer coating" on each exposed end. This method forms polyethylene seals over each end by placing a layer of 0.025 mm aluminum foil coated with 0.025 mm of polyethylene in front of a soldering gun tip heated to about 370° C. An end 13 of a filter is then pushed into the polyethylene side of the laminate, creating contact of the aluminum with the heated soldering tip. The heat from the tip transfers through the aluminum and melts the polyethylene which transfers to the filter ends, thus sealing the ends.

It should be evident from the above examples of sealing techniques that the important consideration is to create a thin, flat seal on the end of the filter that does not diminish sorbent holding capacity while assuring that particles do not escape from the unit. The type of seal employed, and the amount of risk of particle contamination, is in no small part dependent upon the type of sorbent core used.

The sorbent core material 12 may comprise any number of materials which may range from loosely packed particles to filled or highly filled porous materials. As the terms "sorbent" and "sorbing" are used herein, they are intended to encompass any material that removes contaminants from surrounding air, whether through a process of absorbing, adsorbing, or otherwise. A core formed of loosely packed particles preferably contains a binder which holds the particles together. Suitable binders include but are not limited to fluorinated ethylene propylene (FEP), polyvinylidene fluoride (PVDF), acrylics and other commonly used binders as is well known in the art. In addition, the core can comprise one or more layers of an adsorbent or adsorbent filled material such as a scaffold of porous polymeric material in which void spaces are filled with a sorbent. Other possible core constructions include sorbent impregnated wovens or non-wovens, such as cellulose or polymeric non-woven that may include latex or other binders, as well as, porous castings of sorbents and fillers that are polymeric or ceramic. The sorbent core may include a single particular sorbent or may include a mixture of different types of sorbents, the selection of which is dependent on the specific application. The core can also be a woven or nonwoven fabric of carbonized material, such as the (KYNOL™) activated carbon fabric products made by American Kynol, Inc.

A preferred embodiment of the sorbent core 12 utilizes a sorbent filled PTFE sheet wherein the sorbent particles are entrapped within the recular PTFE structure as taught by U.S. Pat. No. 4,985,296 issued to Mortimer, Jr., incorporated by reference. Ideally, particles are packed in a multi-modal (e.g., bi-modal or tri-modal) manner, with particles of different sizes interspersed around one another to fill as much of the available void space between particles as is possible so as to maximize the amount of active material contained in the core. This technique also allows a number of sorbents to be filled into a single layer.

By using PTFE as a binder material for the core, a number of additional advantages are further imparted. PTFE is a non-linting, non-out-gassing inert binder that effectively reduces dusting of sorbent material during manufacturing and during the life of the filter. Additionally, processing advantages of this material include the ability to make a relatively thin, highly loaded material, per U.S. Pat. No. 4,985,296, that can be produced in a wide sheet and then cut (or cut and folded) into desired final widths. In this manner, thin cores can be produced for very low profile sorbent filters.

Perhaps the biggest advantage of using a sorbent filled PTFE core is the core's capacity to achieve high sorbent loading densities. By controlling the sorbent particle sizes and by compression of the extruded sorbent filled PTFE core, very high density sorbent loadings can be achieved. The PTFE structure still allows vapors to penetrate even very densely packed formulations. Examples of high loading densities using the present invention are illustrated below in Table 1:

TABLE 1

Sorbent Packing Density for the Filter of The Present Invention

| % Sorbent/ PTFE in core | Sorbent Mass (gms) | Filter Volume including wrap & seals (cm³) | Overall Filter Sorbent density (gms/cm³) |
| --- | --- | --- | --- |
| 70 | 1.59 | 2.9 | 0.548 |
| 80 | 2.27 | 2.9 | 0.783 |
| * 70 | 2.39 | 2.9 | 0.824 |
| * 80 | 2.73 | 2.9 | 0.941 |
| 70 | 0.032 | 0.061 | 0.525 |
| 80 | 0.046 | 0.061 | 0.754 |
| * 70 | 0.048 | 0.061 | 0.787 |
| * 80 | 0.055 | 0.061 | 0.902 |

* indicates predicted values

Even higher packing densities are believed possible by increasing core sorbent loading percent and total sorbent packing densities.

The effectiveness in packing density of the filter of the present invention compares very favorably with the best sorbent filters commercially available today. Table 2 illustrates the sorbent material packing densities for a GORE-SORBER® module, commercially available from W. L. Gore and Associates, Inc., Elkton, Md.:

TABLE 2

Sorbent Packing Density for the GORE-SORBER ® MODULE

| Tubing Outer Diameter (mm) | Filter (Tubing) Length (cm) | Overall Filter (tube) Volume (cm³) | Sorbent Material Mass (grams) | Sorbent Material Density (gm/cm³) |
| --- | --- | --- | --- | --- |
| 19 | 5.08 | 10.25 | 5.700 | .556 |
| 11 | 3.68 | 2.90 | 1.500 | .517 |
| 11 | 2.95 | 2.50 | 1.050 | .420 |
| 9 | 3.38 | 1.15 | 0.500 | .435 |
| 4 | 1.24 | 0.05 | 0.015 | .300 |

A comparison of Tables 1 and 2 shows that the sorbent density achieved by the present invention is significantly greater than of the commercially available product. Comparing both filters with a volume of 2.9 cc, the commercial product has a sorbent material density is 0.517 gm/cc compared to 0.941 gm/cc for the filter product of the present invention. The sorbent density difference between the filter of the present invention and the commercial filter module is even greater at smaller filter volumes. For example, the present invention can achieve a 0.902 gm/cc sorbent density at a filter volume of 0.061 cc verses a sorbent density of 0.30 gm/cc at a filter volume of 0.05 cc for the commercial product. The high sorbent densities (such as greater than 0.6 g/cc) of the present invention are achieved due to the unique combination of materials and construction of the present invention, maximizing of the core volume as a percentage of the overall filter volume and the use of a highly filled PTFE core.

Examples of sorbent material that may be contained within the core may include: physisorbents (e.g., silica gel, activated carbon, activated alumina, or molecular sieves); chemisorbents (e.g., potassium permanganate, salts, calcium carbonate, calcium sulfate, powdered metals or other reactants for scavenging gas phase contaminants depending on the known contaminants desired to be removed); ion exchange materials; catalytic fillers; as well as mixtures of some of these materials. For some applications it may be desirable to employ multiple layers of sorbent materials, with each layer containing a different sorbent to selectively remove different contaminants as they pass through the filter.

Figure 3:
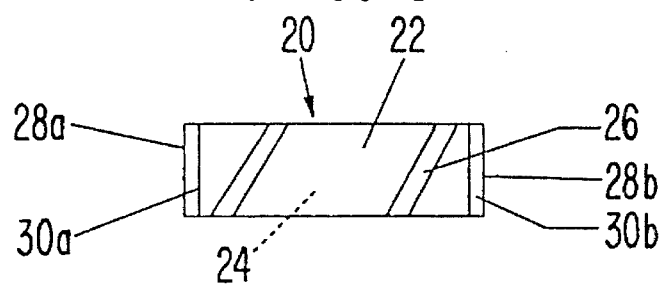
FIG. 3 is a side view of a second embodiment of the filter unit of the present invention where the protective cover is spirally wrapped around the sorbent core with overlapped edges.

Another embodiment of the present invention is shown in FIG. 3. In this instance, the filter 20 includes a protective cover 22 that is helically or spiral wrapped around sorbent core 24. The protective cover 22 may comprise the same porous tape material as that used and described in the cigarette wrapped embodiment described above. By spiral wrapping, the cover forms a tight fit around the core 24, leaving a spiraling seam 26 along its length. Each of the layers of the spiral wrapped material partially overlaps a previous wrap to form the seam 26 in the manner shown. The seam 26 may then be sealed in one of the same manner as that described in the previous embodiment. Ends 28a, 28b may be sealed in the manner previously described, such as with injection molded end caps 30a, 30b.

Figure 4A:
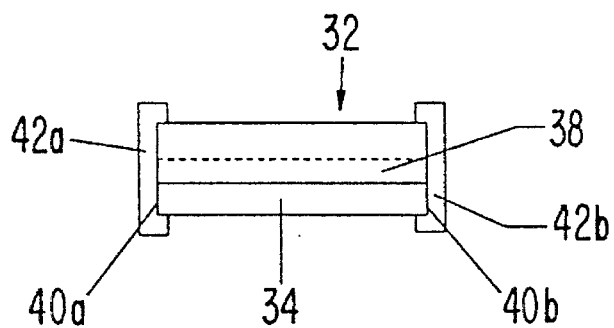
FIG. 4A is a side view of a third embodiment of the filter unit of the present invention where the protective cover is cigarette wrapped around the sorbent core and the ends are sealed with an end cap.
Figure 4B:
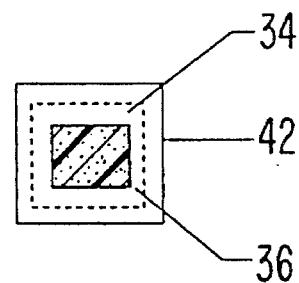
FIG. 4B is an end view of the third embodiment of the present invention.

FIGS. 4A and 4B show yet another embodiment of a filter 32 of the present invention having a protective cover 34 wrapped in a "cigarette" manner around sorbent core 36 and sealed along seam 38. The ends 40a, 40b are sealed with end cap seals 42a, 42b. Each of the end caps 42 fit over the ends and are molded onto the ends or sealed in place, such as with the use of adhesive. Suitable materials for the end caps 42 include injection molded or insertion molded plastics.

Figure 5A:
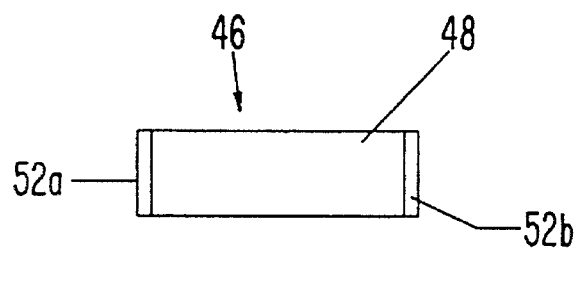
FIG. 5A is a side view of a fourth embodiment of the filter unit of the present invention where the sorbent core is surrounded by a continuous protective cover.
Figure 5B:
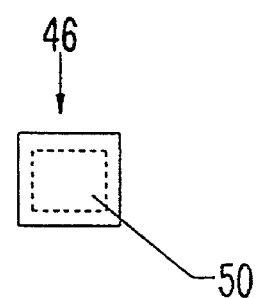
FIG. 5B is an end view of the fourth embodiment of the present invention.

FIGS. 5A and 5B illustrate still another embodiment of a filter 46 of the present invention. A continuous (i.e., seamless) protective cover 48 is employed over sorbent core 50. The continuous protective cover 48 may comprise a tube into which sorbent material is loaded or the protective cover 48 may be extruded over the sorbent core 50. Each of the ends 52a, 52b of this unit may be sealed by any of the methods previously described.

Figure 6A:
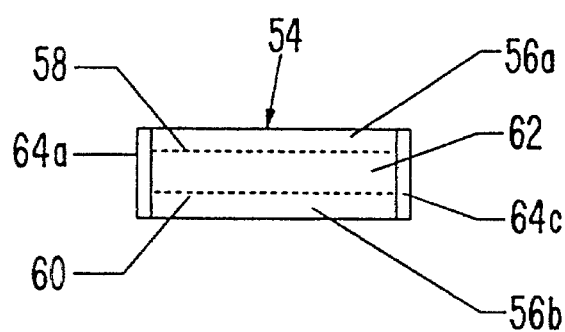
FIG. 6A is a side view of a fifth embodiment of the filter unit of the present invention where filter material is attached to two sides of a sorbent core.
Figure 6B:
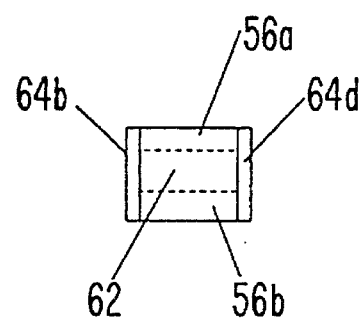
FIG. 6B is an end view of the fifth embodiment of the present invention.

FIGS. 6A and 6B illustrate yet another embodiment of a filter 54 of the present invention. Two flat protective covers 56a, 56b are attached to top and bottom surfaces 58, 60 of a sorbent core 62. Each exposed side of the filter 54 is sealed with seals 64a, 64b, 64c, 64d.

In each embodiment of the present invention, the sorbent filter may be constructed in virtually any desired dimensions. For use as a filter in disk drives, typical dimensions may comprise: a length in the range of 0.0625 to 4 inches (1.58 to 101.6 mm) (preferably about 0.125 inches (3.18 mm) in length or above); thickness of about 0.001" (0.025 mm) or above; width of about 0.010" (0.25 mm) or above; an internal volume of down to 0.025 cc (or less); and a sorbent core comprising at least 15 mg (at least 0.60 gm/cc) of sorbent material. Ideally the volume of the filter comprises about 0.05 to 0.5 cm$^3$, with a ratio of sorbent material to filter volume in the range of 0.25 to 2.0 gm/cc.

With the use of expanded PTFE protective covers in the form of tapes wrapped around the sorbent core, preferred thicknesses of the cover comprises about 0.00005 to 0.020 inches (0.00127 to 0.508 mm).

Given today's handling techniques, perhaps the smallest part manufacturable in accordance with the present invention is one that is about 0.125 mm thick, 0.25 mm wide and 1.5 mm long for a total volume of $4.7 \times 10^{-5}$ cm$^3$. By producing such a product in accordance with the present invention, such a filter may still contain about 40 micrograms of sorbent. With a typical sorbent adsorbing 40% to over 100% of its weight in contaminants, a 40 microgram sorbent can sorb 20 to 40 micrograms of contaminants. This should be sufficient to provide substantial protection of an enclosure that is about 10 to 12 cc in total volume.

Figure 7A:
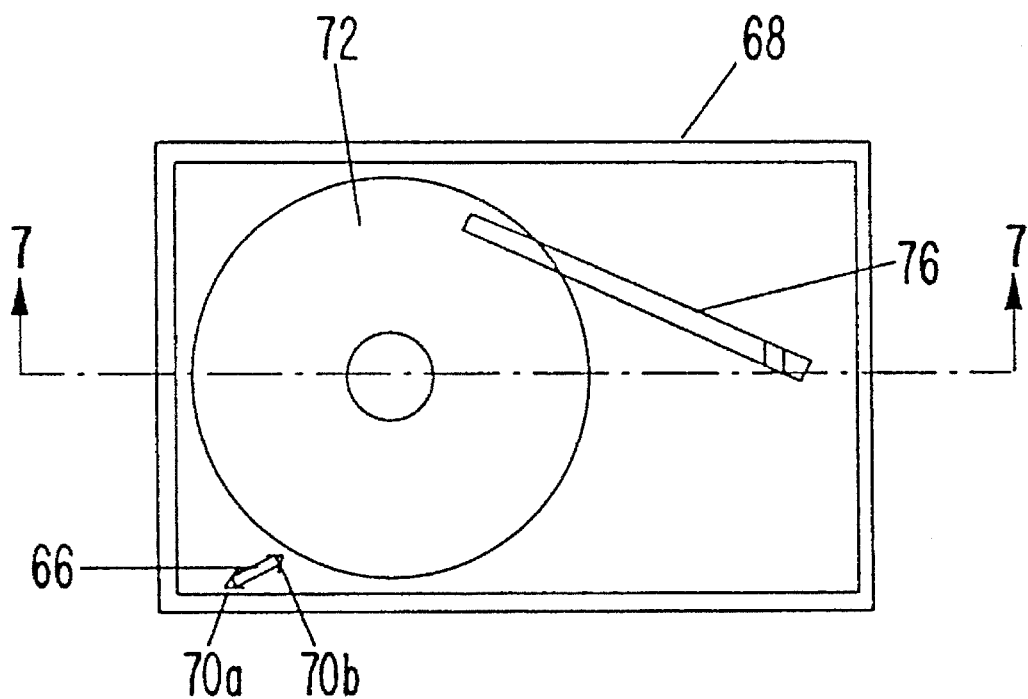
FIG. 7A is a top view of a filter of the present invention positioned in a computer disk drive assembly.
Figure 7B:
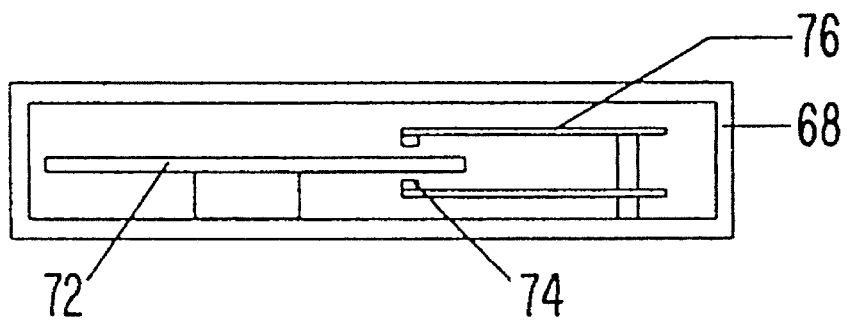
FIG. 7B is a cross-section view along line 7—7 of FIG. 7A.

FIGS. 7A and 7B show an example of the placement of a filter assembly 66 of the present invention mounted in a conventional disk drive assembly 68. As can be seen, the filter assembly 66 of the present invention is small enough that it may be placed virtually anywhere in the disk drive assembly 68, especially in those locations in the drive where contamination sorption may be considered critical. If desired, the filter 66 may be held in place through any suitable means, including within a slot, with clips, with adhesive, or, as shown, with brackets 70a, 70b.

Suggested locations within the disk drive 68 where the filter of the present invention may be mounted include near: magnetic storage disk 72, read/write head 74, or armature 76. Gaseous contaminants that may be of concern in this environment include without limitation: dioctylpthalate; chlorine; hydrogen sulfide; nitrous oxide; mineral acid gases; anionic and cationic species; vapors from silicone; hydrocarbon based cutting oils; and other hydrocarbon pollutants,

EXAMPLES

Without intending to limit the scope of the present invention, the following examples illustrate how the present invention may be made and used:

Example 1

A 70 wt % activated carbon and 30 wt % PTFE adsorbent core was made by the following method: 6874 g. of Calgon PCB-G carbon and 69, 800 g. of deionized H$_2$O was mixed in a 115 liter baffled stainless container. While the slurry was agitating, 2610 g. of PTFE in the form of a 24.8 % aqueous dispersion was rapidly poured into the vessel. The PTFE dispersion used was AD-059 obtained from ICI Americas, Inc. The mixture coagulated within 1 minute and after 2½ minutes, the mixer was stopped. The coagulum settled to the bottom and the effluent was clear.

The coagulum was dried at 160° C. in a convection oven. The dried cake was chilled below 0° C. It was hand ground through a 635 cm stainless mesh screen. Next, 0.701 g of mineral spirits was added per gram of filled powder. The mixture was chilled, passed through a screen again, tumbled then allowed to sit for greater than 16 hours at ambient.

A 10.6 cm diameter pellet was formed in a cylinder at 860 psi. The pellet was heated approximately 16 hours at 49° C. The pellet was then extruded into tape. The tape was then calendered between heated rolls to a thickness of 0.127 cm. The bulk of the lubricant was evaporated by running the tape across heated rollers. The partially dried tape was then solvent extracted in isopropanol in a sonicated bath. The isopropanol was removed in a vacuum oven.

The tape was then slit to 0.356 cm width by running a 10 cm width through a blade box. The final tape density was 0.75 g/cc.

A protective cover tape was made in accordance with the above procedure except 1453 g of PFA solids in the form of a 22.7% aqueous dispersion was added to 50,000 g of H$_2$O. 7247 g of PTFE solids in the form of 23.7% aqueous dispersion was rapidly poured into the vessel. The PFA used was type AD-059 obtained from ICI Americas, Inc. After 1 minute of mixing, 14.6 g of polyethylene imine was added to induce co-coagulation. Total mixing time was one minute and forty seconds.

The cake was dried at 165° C., chilled, screened, and lubricated at 0.175 g of mineral spirits per gram of filled powder. The mixture was chilled, screened, left at ambient for 16 hours and then pelletized. The pellet was heated to 49° C. for 16 hours and extruded into tape form. The tape was calendered through rolls to 0.046 cm. The lubricant was removed by evaporating across heated rolls in 2 passes. On the second pass, the tape was expanded at a 2:1 ratio at 105 feet per minute and a maximum temp of 275° C. The tape was then stretched across two heated surfaces at 340° C. at 25:1 and 2:1 expansion ratios and an output speed of 75 ft/min. The expanded tape was 0.0025 cm thick and approximately 0.7 g/cc.

A filter assembly of the present invention was made by slitting the covering tape to approximately a 1.27 cm width and hand wrapped around slit carbon filled strips such that a single overlap was formed down the length of the strip. This overlap was then sealed using a 345° C. heated blade with mild pressure. The wrapped composite was then cut into 1.194 cm sections.

The filter ends were sealed by dipping them into a less than 0.08 cm deep layer of finely ground polyester powder. The ends were then sealed by placing in front of a 550° C. hot air stream. This process was performed three times to produce a uniform bead of polyester encapsulating the ends.

Example 2

Process for Example 1 except 9835 g of 92% dry Barneby Sutcliffe YF activated carbon was added to 55,000 g of deionized H$_2$O. Next, 2264 g of PTFE solids in the form of aqueous dispersion was rapidly poured in the agitating slurry.

After powder preparation, 0.693 g of mineral spirits was added per gram of filled powder. The extruded paste was calendered through heated rollers to 0.107 cm. After lubricant removal, the tape was compressed to 0.064 cm. The bulk density was 1.0 g/cc.

A filter assembly of the present invention was then formed by slitting this tape to 0.356 mm in width and wrapping it with a protective cover type similar to that used in Example 1, forming an overlapped seam down the length of the core. The seam and filter ends were sealed as in Example 1.

Example 3

A wrapped adsorbent core was made as taught in Example 1. The filter ends were sealed by a thin layer of about 0.025 mm of polyester that was transferred onto the ends by pressing a soldering iron heated to about 370° C. through a 0.025" thick polyester film. The soldering iron was coated with the polyester film and transferred polyester coating onto the ends, sealing the ends when the soldering iron was pressed against them.

Example 4

A wrapped adsorbent core was made as taught in Example 1. The filter ends were sealed with a thin layer at about 0.025 mm of polyethylene in the following manner. A soldering iron heated to about 370° C. was pressed against a 0.025" thick aluminum foil coated with a 0.025" thick polyethylene layer and the ends were pressed against the polyethylene sides heat transferred through the aluminum foil melting the polyethylene onto the end to seal end.

In summary, the present invention provides a very thin sorbent filter assembly that is easy to manufacture, non-particulating, non-out-gassing, compact, manufacturable in small sizes, and is able to hold proportionately large amounts of densely packed sorbent material. Although the above description was primarily directed to production of a filter for use in a computer disk drive application, the present invention can be used in many other applications, for example, electronic control boxes, automobiles, optical equipment, optical cable, etc.

While particular embodiments of the present invention have been illustrated and described herein, the present invention should not be limited to such illustrations and descriptions. It should be apparent that changes and modification may be incorporated and embodied as part of the present invention within the scope of the following claims.

We claim:

1. A sorbent filter for selectively sorbing contaminants present in an enclosure that houses sensitive equipment to protect the sensitive equipment within the enclosure from damage caused by the contaminants, the filter having a height, depth and length, and comprising:

an inner sorbent core including contaminant sorbent material therein;

an outer protective cover wrapped around the inner sorbent core so as to completely contain the sorbent core along its length, and leaving exposed at least one end, the protective cover having a thickness ranging from about 0.00005 to about 0.040 inches;

a sealed seam retaining the protective cover around the sorbent core; and an end seal for each at least one exposed end, completely encapsulating the sorbent core within the filter, the end seal sealing the sorbent filter such that the sorbent material holding capacity of the filter is not diminished along the length of the filter; and wherein the sorbent filter is operable to protect the sensitive equipment within the enclosure from damage caused by the contaminants.

2. The sorbent filter of claim 1, wherein the filter has an internal volume of less than 0.5 cc and the sorbent core comprises at least 0.60 gm/cc of sorbent material.

3. The sorbent filter of claim 1, wherein the protective cover comprises a thin tape formed of a sheet of microporous material that is longitudinally wrapped and sealed around the sorbent core.

4. The sorbent filter of claim 1, wherein the protective cover comprises a thin tape formed of a sheet of microporous material that is spiral wrapped around the sorbent core, each turn of wrap at least partially overlapping the previous turn and sealed onto itself so as to seal the sorbent core.

5. The sorbent filter of claim 1, wherein the protective cover comprises a thin tape formed of a membrane from a group consisting of polypropylene, nylon, composites of polycarbonate and polyesters, mixed cellulose esters, and cellulose acetate.

6. The sorbent filter of claim 1, wherein the protective cover comprises a thin tape of an expanded porous polytetrafluoroethylene (PTFE) membrane.

7. The sorbent filter of claim 1, wherein the sorbent material comprises a microporous polymeric material having sorbent particles contained within the microporous structure of the polymeric material.

8. The sorbent filter of claim 7, wherein the sorbent material comprises a filled polytetrafluoroethylene (PTFE) membrane.

9. The sorbent filter of claim 1, wherein the sorbent material comprises a chemisorber.

10. The sorbent filter of claim 1, wherein the sorbent material comprises an ion exchange resin or catalytic material.

11. The sorbent filter of claim 1, wherein the sorbent material comprises a physisorber.

12. The sorbent filter of claim 1, wherein the end seal for the at least one exposed end comprises a coating selected from a group consisting of polyethylene, polypropylene, polyester, nylon, perfluoroalkyl copolymer (PFA), and polyvinylidene fluoride (PVDF).

13. The sorbent filter of claim 1, wherein the sorbent material comprises a sorbent filled polytetrafluoroethylene and the outer wrap is formed of a polytetrafluoroethylene membrane which is fusion bonded to the sorbent core.

14. The sorbent filter of claim 1, wherein the end seal for the at least one exposed end comprises polytetrafluoroethylene fusion bonded to the sorbent core and to the protective cover.

15. The sorbent filter of claim 1, wherein the inner sorbent core includes a packing density of sorbent material greater than 0.6 g/cc.

16. A sorbent filter for selectively adsorbing contaminants present in an enclosure that houses sensitive equipment to protect the sensitive equipment within the enclosure from damage caused by the contaminants, comprising;

a sorbent core including contaminant sorbent material;

two layers of thin protective membrane laminate of two opposing sides of the sorbent core, leaving sides of the core exposed, each layer of the protective membrane having a thickness ranging from about 0.00005 to about 0.040 inches; and seals on each exposed side of the filter, completely encapsulating the sorbent core within the filter, the seals sealing the sorbent filter such that the sorbent material holding capacity of the filter is not diminished along the length of the filter; and wherein the sorbent filter is operable to protect the sensitive equipment within the enclosure from damage caused by the contaminants.

17. The sorbent filter of claim 16, wherein the sorbent material comprises of a sorbent filled porous polytetrafluoroethylene.

18. The sorbent filter of claim 16, wherein the seals comprise a coating of a thermoplastic material.

19. The sorbent filter of claim 16, wherein the seals comprise a thermoset material.

20. The sorbent filter of claim 16, wherein the seals comprise injection molded material adhered to the exposed sides.

21. The sorbent filter of claim 16, wherein the sorbent material comprises a polymeric porous structure with sorbent contained within the microporous structure and the outer layers are formed of a polymeric porous material.

22. A sorbent filter for selectively filtering and adsorbing components present in an enclosure that houses sensitive equipment to protect the sensitive equipment within the enclosure from damage caused by the contaminants, the sorbent filter having a predetermined length and comprising:

an extruded outer protective layer and an inner sorbent material core, the protective layer having a thickness ranging from about 0.00005 to about 0.040 inches, the extruded outer protective layer and the inner sorbent material core having at least one exposed end; and an end seal for each at least one exposed end, completely encapsulating the sorbent core within the outer protective layer, the end seal sealing the sorbent filter such that the sorbent material holding capacity of the filter is not diminished along the length of the filter; and wherein the sorbent filter is operable to protect the sensitive equipment within the enclosure from damage caused by the contaminants.

23. The sorbent filter of claim 22, wherein the outer protective layer includes porous polytetrafluoroethylene and the inner core includes sorbent filled porous polytetrafluoroethylene.

* * * * *